(12) United States Patent
Okamoto et al.

(10) Patent No.: US 10,883,465 B2
(45) Date of Patent: Jan. 5, 2021

(54) SOLENOID VALVE AND METHOD FOR MANUFACTURING THE SAME

(71) Applicant: Hitachi Automotive Systems, Ltd., Hitachinaka (JP)

(72) Inventors: Shinya Okamoto, Tokyo (JP); Xudong Zhang, Tokyo (JP); Nobuaki Kobayashi, Hitachinaka (JP); Takahiro Saito, Hitachinaka (JP); Akihiro Yamazaki, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 190 days.

(21) Appl. No.: 16/063,379

(22) PCT Filed: Dec. 24, 2015

(86) PCT No.: PCT/JP2015/085982
§ 371 (c)(1),
(2) Date: Jun. 18, 2018

(87) PCT Pub. No.: WO2017/109886
PCT Pub. Date: Jun. 29, 2017

(65) Prior Publication Data
US 2018/0363612 A1     Dec. 20, 2018

(51) Int. Cl.
*F02M 61/20* (2006.01)
*F02M 61/16* (2006.01)
(Continued)

(52) U.S. Cl.
CPC ...... *F02M 61/166* (2013.01); *F02M 51/0625* (2013.01); *F02M 51/0664* (2013.01);
(Continued)

(58) Field of Classification Search
CPC ........ F16K 31/0675; F02M 2200/9061; F02M 2200/9069; F02M 2200/08; F02M 2200/8084; F02M 51/0664
See application file for complete search history.

(56) References Cited

U.S. PATENT DOCUMENTS 3,865,312 A * 2/1975 Lombard ............. F02M 51/005
239/585.1
6,386,467 B1 * 5/2002 Takeda ............... F02M 51/0617
239/585.1
(Continued)

FOREIGN PATENT DOCUMENTS

JP      H06-279965 A      10/1994
JP      2000-021628 A      1/2000
(Continued)

OTHER PUBLICATIONS

JP-2001-87875, Apr. 3, 2001, Aisin Seiki, English translation—Description, pp. 4-12.*
(Continued)

*Primary Examiner* — Matthew W Jellett
*Assistant Examiner* — Christopher D Ballman
(74) *Attorney, Agent, or Firm* — Foley & Lardner LLP (57) ABSTRACT

A solenoid pipe is formed of a ferromagnetic material containing 15-18 mass % of Cr, an electromagnetic coil, and a valve body. The pipe includes a reform portion, having a composition in which a component of the ferromagnetic material is mixed with a component of a Ni-containing material. A ratio, e/d, of a maximum deformation, e, of an outer circumferential surface side of the reform portion of the pipe with respect to a thickness, d, of the pipe near the reform portion is 0.5 or less, and a ratio, c/d, of a maximum (Continued)

deformation, c, of an inner circumferential surface side of the reform portion of the pipe with respect to the thickness, d, of the pipe is 0.5 or less.

17 Claims, 5 Drawing Sheets

(51) Int. Cl.
*F02M 51/06* (2006.01)
*F16K 31/06* (2006.01)
*H01F 1/03* (2006.01)
*H01F 7/08* (2006.01)

(52) U.S. Cl.
CPC .......... *F02M 61/168* (2013.01); *F02M 61/20* (2013.01); *F16K 31/0675* (2013.01); *H01F 1/0302* (2013.01); *H01F 7/081* (2013.01); *F02M 2200/08* (2013.01); *F02M 2200/8084* (2013.01); *F02M 2200/9061* (2013.01); *F02M 2200/9069* (2013.01)

(56) References Cited

U.S. PATENT DOCUMENTS

| | | | | |
|---|---|---|---|---|
| 6,508,416 | B1* | 1/2003 | Mastro | F02M 51/0639 |
| | | | | 239/533.2 |
| 6,851,630 | B2* | 2/2005 | Nagaoka | F02M 51/0614 |
| | | | | 239/533.11 |
| 7,252,249 | B2* | 8/2007 | Molnar | F02M 51/0667 |
| | | | | 148/325 |
| 7,506,826 | B2* | 3/2009 | Miller | B05B 1/302 |
| | | | | 239/585.1 |
| 7,690,357 | B2* | 4/2010 | Fujimoto | F02M 51/0657 |
| | | | | 123/467 |
| 8,020,789 | B2* | 9/2011 | Roessler | F02M 51/0664 |
| | | | | 239/533.2 |
| 9,366,355 | B2* | 6/2016 | McFarland | F16K 31/0662 |
| 9,822,749 | B2* | 11/2017 | Derenthal | F02M 61/168 |
| 2002/0047054 | A1* | 4/2002 | Dallmeyer | F02M 51/0671 |
| | | | | 239/585.1 |
| 2007/0113405 | A1* | 5/2007 | Reiter | B21C 37/06 |
| | | | | 29/890.124 |
| 2016/0369759 | A1* | 12/2016 | Masuda | C22C 38/00 |
| 2018/0187640 | A1* | 7/2018 | Zhang | B23K 26/064 |

FOREIGN PATENT DOCUMENTS

| | | |
|---|---|---|
| JP | 2001-012636 A | 1/2001 |
| JP | 2001-087875 A | 4/2001 |
| JP | 2004-281737 A | 10/2004 |
| JP | 2007-318009 A | 12/2007 |
| WO | WO-2012/172864 A1 | 12/2012 |

OTHER PUBLICATIONS

JP-2000-021628, Jan. 21, 2000, Aisin Seiki, English translation—Description, pp. 2-4.*
JPH-06279965, Oct. 4, 1994, Mazda Motor, English translation—Description, pp. 4-13.*
JP-2001-12636, Jan. 16, 2001, Aisin Ind, English translation—Description, pp. 4-15.*
WO-2012-172864, Dec. 20, 2012, Jtekt Corp, English translation—Description, pp. 5-20.*
International Search Report with English translation and Written Opinion issued in corresponding application No. PCT/JP2015/085982 dated Apr. 5, 2016.

* cited by examiner

SOLENOID VALVE AND METHOD FOR MANUFACTURING THE SAME

TECHNICAL FIELD

The present invention relates to a solenoid valve using a pipe in which a local feeble magnetization process is applied to the pipe which is entirely ferromagnetic before the process and a method for manufacturing the same.

BACKGROUND ART

In recent years, regulations on fuel efficiency have been strengthened, and reduction in fuel consumption has been required for automobile engines. In automobile engines, a fuel injection valve is used as one type of solenoid valve. To reduce fuel consumption, micro injection control of fuel is essential in fuel injection valves. In an internal combustion engine of an automobile or the like, an electromagnetic type fuel injection valve driven by an electric signal from an engine control unit is widely used.

On the outside of the pipe made of a ferromagnetic material, a solenoid coil is provided. Inside the pipe, a pipe connector and an anchor attached to a valve body are provided. When the valve is closed, the valve body receives a force from a spring and is urged to a valve seat side. A magnetic circuit is formed around the solenoid coil by an electromagnetic force generated by a pulse voltage applied to the solenoid coil and the anchor is drawn into the pipe connector. As a result, the valve is opened by the valve body being separated from the valve seat, and the fuel is injected from a tip end of the fuel injection valve.

In order to concentrate a magnetic flux on a contact surface of the anchor and the pipe connector and generate a suction force to the anchor and the pipe connector, a portion of the pipe has to be nonmagnetic or feeble magnetic to suppress magnetic flux leakage. As a method for nonmagnetizing or feeble magnetizing a portion of the pipe, a method of irradiating an outer circumferential surface of the pipe with a high energy-density beam such as a laser is widely known.

As a method for irradiating the outer circumferential surface of the pipe with the high energy-density beam, PTL 1 discloses a method of performing beam irradiation while supplying non-oxidizing shield gas inside a hollow member to form a non-magnetized or feebly magnetized reform portion by the beam irradiation while adding a reforming material to a part of the outer circumferential surface of the hollow member of a magnetic material.

As another method for irradiating the outer circumferential surface of the pipe with the high energy-density beam, PTL 2 discloses a method of absorbing heat from an inner circumferential surface of an aluminum alloy liner with a copper chiller by fitting the copper chiller into the liner to uniformly refine silicon in an aluminum alloy while suppressing deformation of the liner when irradiating an outer circumferential surface of the liner with the beam.

CITATION LIST

Patent Literature

PTL 1: JP-A-2001-87875
PTL 2: JP-A-6-279965

SUMMARY OF INVENTION

Technical Problem

In the method disclosed in PTL 1, since the shield gas is the only medium for supporting a process part from the inner circumferential surface of the hollow member, there is a problem that it is difficult to control a depressing deformation amount on the inner circumferential surface side and a recessed deformation amount on the outer circumferential surface side of the process portion of the hollow member to be suppressed or reduced below a predetermined value.

In the method disclosed in PTL 2, since only irradiation with the high energy-density beam is performed on an outer circumferential surface of a cylindrical member and the process part cannot be locally feeble magnetized, the method cannot be applied to a manufacturing of the solenoid valve. With this method, since the process part is oxidized by the beam irradiation, there is a problem that strength of the process part decreases.

The present invention has been made in view of the conventional problems, and an object thereof is to obtain a locally feeble magnetized pipe with high dimensional accuracy and a solenoid valve using the pipe. Moreover, in the pipe which is entirely ferromagnetic before the process and is locally feeble magnetized after the process, an object of the present invention is to reduce the depressing deformation amount on the inner circumferential surface side and the recessed deformation amount on the outer circumferential surface side of the process portion (reform portion) with a less man-hour and easier processing.

Solution to Problem

According to the present invention, there is provided a solenoid valve including: a pipe formed of a ferromagnetic material containing 15 mass % or more to 18 mass % or less of Cr; an electromagnetic coil; and a valve body. A part of the pipe includes a reform portion, and the reform portion has a composition in which a component of the ferromagnetic material is mixed with a component of a Ni-containing material. e/d which is a ratio of a maximum deformation amount e of an outer circumferential surface side of the reform portion of the pipe with respect to a thickness d of the pipe near the reform portion is 0.5 or less, and c/d which is a ratio of a maximum deformation amount c of an inner circumferential surface side of the reform portion of the pipe with respect to the thickness d of the pipe is 0.5 or less.

According to the present invention, there is provided a method for manufacturing a solenoid valve which includes a pipe formed of a ferromagnetic material containing 15 mass % or more to 18 mass % or less of Cr, an electromagnetic coil, and a valve body, in which a part of the pipe includes a reform portion, the method including: a step of fitting a deformation suppressing member having a thermal conductivity of 30 W/m·K or more at 100° C. into an inner circumferential surface side of the pipe; a step of supplying or attaching a Ni-containing material to a part of the pipe; and a step of forming the reform portion by applying heat from an outer side to a portion where the Ni-containing material is supplied or attached.

Advantageous Effects of Invention

According to the present invention, it is possible to obtain a locally feeble magnetized pipe with high dimensional accuracy and a solenoid valve using the pipe.

Furthermore, according to the present invention, it is possible to reduce the depressing deformation amount on the inner circumferential surface side and the recessed deformation amount on the outer circumferential surface side of the process portion (reform portion) in the pipe which is entirely ferromagnetic before the process and is locally feebly magnetic after the process.

By using the pipe in the solenoid valve, it is possible to enhance responsiveness in opening and closing the solenoid valve with respect to the pulse voltage applied to the electromagnetic coil. Furthermore, in a case where the solenoid valve is used as the fuel injection valve in the automobile engine, it can contribute to the improvement in the fuel consumption of the automobile.

DESCRIPTION OF EMBODIMENTS

The present invention relates to a pipe which is entirely ferromagnetic before the process and subjected to local feeble magnetization process, and a solenoid valve using the pipe. In other words, the present invention relates to a pipe in which a reform portion is formed by applying feeble magnetization process in a part of a ferromagnetic pipe and the solenoid valve using the pipe.

In a pipe which is entirely ferromagnetic before the process, the present invention controls a depressing deformation amount on the inner circumferential surface side and a recessed deformation amount on the outer circumferential surface side to be small, and enhances responsiveness of the solenoid valve by using the pipe in which a process portion is locally feeble magnetized in the solenoid valve.

It is desirable that a/b which is a ratio of a width a of the reform portion of an outer circumferential surface side of the pipe with respect to a width b of the reform portion of the inner circumferential surface side of the pipe is 1.4 or more.

It is desirable that c/b which is a ratio of a maximum deformation amount c on the inner circumferential surface side of the pipe with respect to the width b of the reform portion of the inner circumferential surface side of the pipe is 0.025 or less.

It is desirable that a saturation magnetization value of the reform portion at an applied magnetic field of $1.6 \times 10^6$ A/m is less than 0.6 T.

It is desirable that the reform portion is formed in a thin portion of the pipe.

It is desirable that the reform portion is formed in an annular shape in the pipe.

In the method for manufacturing a solenoid valve of the present invention, it is desirable that the pipe rotates around the deformation suppressing member as a rotation axis.

It is desirable that shield gas is supplied around the pipe.

It is desirable that a portion where the Ni-containing material is supplied or attached is a portion near a contact surface between an anchor and a pipe connector in the outer circumferential surface of the pipe.

It is desirable that the Ni-containing material is one of a wire, a powder, or a coating.

It is desirable that a cross-sectional shape of the wire is circle, ellipse or rectangle, and is solid or hollow.

It is desirable that the wire is supplied by being wound around a part of the outer circumferential surface of the pipe or by continuously being fed to the part of the outer circumferential surface of the pipe.

It is desirable that the powder includes solid or hollow particles.

It is desirable that the coating is formed on at least a part of the outer circumferential surface of the pipe before the heat is applied.

It is desirable that the heat is supplied by laser irradiation, electron beam irradiation, or high-frequency induction heating.

Hereinafter, a fuel injection valve is exemplified as a typical example of the solenoid valve, and an embodiment of the present invention will be explained with reference to the drawings. The solenoid valve of the present invention can be used in automotive equipment such as a fuel pump or a flexible system having a functional unit requiring on/off control of fluid such as fuel, oil, water, or air as well as on/off control equipment in general of fluid other than the automotive equipment. Moreover, the solenoid valve of the present invention is not limited to the embodiment described below.

[Configuration and Operation Principle of Fuel Injection Valve]

Figure 1:
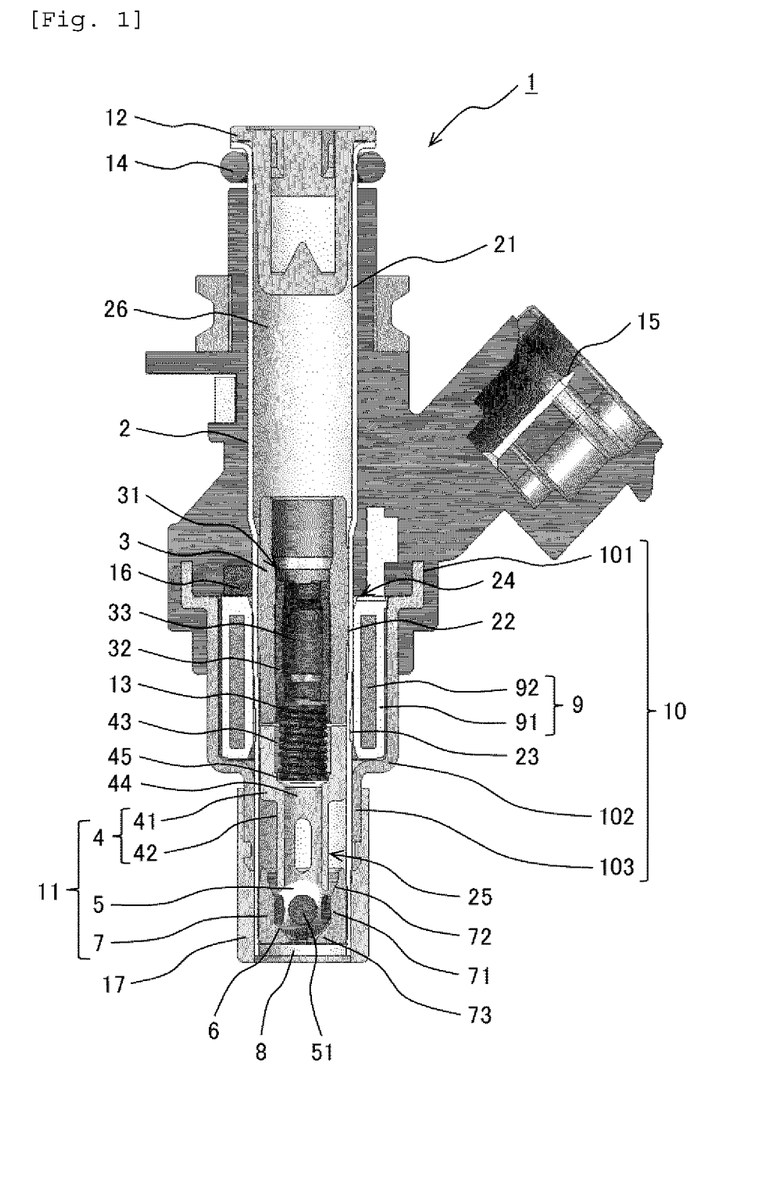
FIG. 1 is a longitudinal sectional view illustrating a fuel injection valve.

FIG. 1 is a diagram illustrating a section parallel to an axial direction of a fuel injection valve 1.

In the diagram, the fuel injection valve 1 is a valve used in a gasoline engine of an automobile, and is a low pressure type fuel injection valve for injecting fuel toward the inside of intake manifold. Hereinafter, in FIG. 1, an upper side of a paper surface of the fuel injection valve 1 is written upstream, and a lower side of the paper surface of the fuel injection valve is written downstream.

The fuel injection valve 1 is provided with a pipe 2 made of a ferromagnetic material, a pipe connector 3 accommodated in an inner portion of the pipe 2, an anchor 4, a valve body 5 fixed to the anchor 4, a valve seat member 7 including a valve seat 6 which is closed by the valve body 5 when closing the valve, a nozzle plate 8 having a fuel injection hole for injecting the fuel when opening the valve, an electromagnetic coil 9 which operates the valve body 5 in a valve opening direction when being energized, and a yoke 10 for guiding a magnetic flux line.

The pipe 2, for example, is made of a metal pipe formed with a magnetic metal material such as electromagnetic stainless steel, and forms a stepped cylindrical shape as described in FIG. 1 by using means such as a press processing such as deep drawing, or a grinding process. The pipe 2 has a large diameter portion 21, and a small diameter portion 22 smaller in diameter than the large diameter portion 21.

In the small diameter portion 22, a thin portion 23 having a thinned portion is formed. The small diameter portion 22 is configured with a pipe connector accommodating portion 24 for accommodating the pipe connector 3 on the upstream side of the thin portion 23, and a valve member accommodating portion 25 for accommodating a valve member 11 including the anchor 4, the valve body 5, and a valve seat member 7 on the downstream side of the thin portion 23. The thin portion 23 is formed so as to surround a gap between the pipe connector 3 and the anchor 4 in a state where the pipe connector 3 and the anchor 4 are accommodated in the pipe 2. The thin portion 23 increases magnetic resistance between the pipe connector accommodating portion 24 and the valve member accommodating portion 25 and magnetically blocks the pipe connector accommodating portion 24 and the valve member accommodating portion 25 from each other.

A fuel passage 26 for sending the fuel to the valve member 11 is formed inside the large diameter portion 21. On the upstream side of the large diameter portion 21, a fuel filter 12 for filtering fuel is provided.

The pipe connector 3 is formed in a cylindrical shape having a hollow portion 31, and is press-fitted into the pipe connector accommodating portion 24 of the pipe 2. A spring receiving member 32 fixed by means for press-fitting or like is accommodated in the hollow portion 31. A fuel passage 33 penetrating in the axial direction is formed in a center portion of the spring receiving member 32.

The anchor 4 is formed with a magnetic member and is fixed to the valve body 5 by welding on the downstream side thereof. The anchor 4 has a large diameter portion 41 having an outer diameter slightly smaller than an inner circumference of the small diameter portion 22 of the pipe 2 on the upstream side, and a small diameter portion 42 having an outer diameter smaller than the large diameter portion 41.

A spring accommodating portion 43 is formed inside the large diameter portion 41. An inner diameter of the spring accommodating portion 43 is formed to be substantially equal to an inner diameter of the hollow portion 31 of the pipe connector 3. A fuel passage hole 44, which is a through-hole having an inner diameter smaller than the inner circumference of the spring accommodating portion 43, is formed in the bottom portion of the spring accommodating portion 43. A spring receiving portion 45 is provided in the bottom portion of the spring accommodating portion 43.

The outer shape of the valve body 5 is substantially spherical, and the valve body 5 has a fuel passage 51 which is cut and perforated in parallel to the axial direction of the fuel injection valve 1 on the outer circumferential surface.

In the valve seat member 7, the substantially conical valve seat 6, a valve body holding hole 71 formed substantially at the same diameter as the valve body 4 on the upstream side of the valve seat 6, an upstream opening portion 72 formed to have a larger diameter toward upstream side form the valve body holding hole 71, and a downstream opening portion 73 opening on the downstream side of the valve seat 6 are formed. The valve seat 6 is formed to have a smaller diameter from the valve body holding hole 71 toward the downstream opening portion 73, and when the valve is closed, the valve body 5 is seated on the valve seat 6. The nozzle plate 8 is welded on the downstream side of the valve seat member 7.

The anchor 4 and the valve body 5 are arranged in the pipe 2 to be operatable in the axial direction. A coil spring 13 is formed between the spring receiving portion 45 of the anchor 4 and the spring receiving member 32 to urge the anchor 4 and the valve body 5 toward the downstream side. The valve seat member 7 is inserted into the pipe 2 and fixed to the pipe 2 by welding. An O-ring 14 is provided on the outer circumference of the upstream portion of the pipe 2 for connecting to piping of the pump for sending the fuel.

The electromagnetic coil 9 is provided on the outer circumferential portion of the pipe connector 3 of the pipe 2. The electromagnetic coil 9 is configured with a bobbin 91 formed with a resin material, and a coil 92 wound around the bobbin 91. The coil 92 is connected to an electromagnetic coil control device via a connector pin 15.

The yoke 10 has a hollow through-hole, and is configured with a large diameter portion 101 formed on the upstream side, a medium diameter portion 102 having a smaller diameter than the large diameter portion 101, and a small diameter portion 103 having a smaller diameter than the medium diameter portion 102 on the downstream side. The small diameter portion 103 is fitted into the outer circumference portion of the valve member accommodating portion 25. The electromagnetic coil 9 is disposed on the inner circumference portion of the medium diameter portion 102. A coupling core 16 is disposed on the inner circumference portion of the large diameter portion 101.

The coupling core 16 is formed with a magnetic metal material or the like. The large diameter portion 101 and the pipe 2 are connected by the coupling core 16. That is, the yoke 10 is connected to the pipe 2 in the small diameter portion 103, and the large diameter portion 101, and is magnetically connected to the pipe 2 at both end portions of the electromagnetic coil 9. A protector 17 for protecting the tip end of the pipe 2 is attached on the downstream side of the yoke 10.

When power is supplied to the electromagnetic coil 9 via the connector pin 15, a magnetic field is generated, and the magnetic force of the magnetic field opens the anchor 4 and the valve body 5 against the urging force of the coil spring 13. As a result, the fuel supplied from the pump is injected to a combustion chamber of the engine.

[Reforming Method]

Figure 2A:
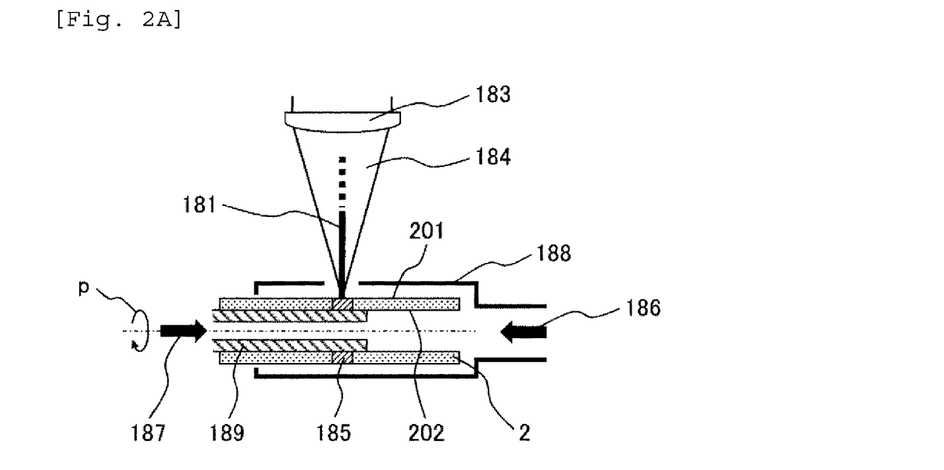
FIG. 2A is a longitudinal sectional view illustrating a main portion of a reforming device of a pipe of an example.
Figure 2B:
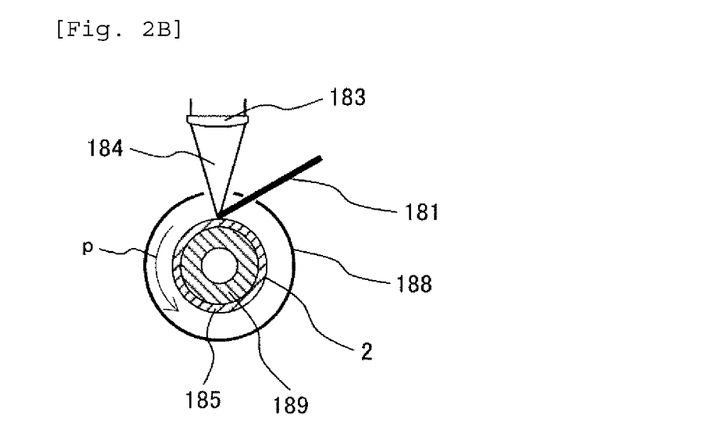
FIG. 2B is a cross sectional view illustrating the main portion of the reforming device of the pipe of the example.

FIG. 2A is a longitudinal sectional view illustrating a main portion of a reforming device of the pipe. FIG. 2B is a cross sectional view illustrating the main portion of the reforming device of the pipe.

It is desirable that the pipe 2 is a ferritic stainless steel which is a ferromagnetic material. An example includes a material containing 16.49 mass % of Cr, 0.44 mass % of Si, 0.19 mass % of Ni, 0.01 mass % of C, and 0.25 mass % of Mn. The composition of the pipe 2 is not limited to this, and a ferritic stainless steel such as SUS 430 can be used.

Reforming is carried out by adding a Ni-containing material to the thin portion 23 (shown in FIG. 1) on the outer circumferential surface of the pipe 2. The Ni-containing material in the present embodiment is a pure Ni material, and is a wire 181 having a solid circular cross-sectional shape.

Heat supply from the outside is performed by laser irradiation (fiber laser with a wavelength of 1070 nm). The outer circumferential surface of the pipe 2 is irradiated with a laser beam 184 as a circular laser beam transmitted from a laser oscillator through a fiber having a fiber core with diameter of 0.1 mm via a condenser lens 183. A cylindrical lens is used for the condenser lens 183, and the laser beam 184 at the focal position is converted so that the shape of the laser beam 184 is linear (width 5 mm, depth 0.2 mm). The out-of-focus distance of the laser beam 184 with respect to the outer circumferential surface (reform portion) of the pipe 2 is set to 0 mm, and the outer circumferential surface of the pipe 2 is irradiated with the beam so that the width direction of the laser beam 184 at the focal position is parallel to the longitudinal direction of the pipe 2.

When irradiating the outer circumferential surface of the pipe 2 with the laser beam 184, the deformation suppressing member 189 having a solid or hollow cross-sectional shape is fitted into the inner circumferential surface side 202 of the pipe 2. In order to secure a path of a pipe inner circumferential surface shield gas 187, it is preferable that the cross-sectional shape of the deformation suppressing member 189 is hollow. The outer diameter of the deformation suppressing member 189 has to be smaller than the inner diameter of the pipe 2 in order to be fitted into and remove from the deformation suppressing member 189 on the inner circumferential surface side 202 of the pipe 2. However, since the purpose of fitting the deformation suppressing member 189 is to minimize the deformation amount on the inner circumferential surface side 202 of the pipe 2 when the laser beam 184 is applied, it is desirable that the outer diameter of the deformation suppressing member 189 is increased within a range in which fitting and removal of the deformation suppressing member 189 on the inner circumferential surface side 202 of the pipe 2 is possible. In the present embodiment, the laser beam irradiation is performed as the heat supply from the outside, but the present invention is not limited thereto, and the electron beam irradiation and the high-frequency induction heating can also be used.

It is preferable that the length of the deformation suppressing member 189 is greater than the width b of the inner circumferential surface side 202 of the reform portion 185 of the pipe 2, and the entire reform portion 185 is covered with the deformation suppressing member 189. In the deformation suppressing member 189, a metal material having a thermal conductivity higher than the thermal conductivity of the pipe 2 is used. In the case where the ferritic stainless steel is used for pipe 2, the thermal conductivity is less than 30 W/m·K at 100° C. Therefore, the thermal conductivity of the deformation suppressing member 189 is preferably 30 W/m·K or more at 100° C. More preferably, the deformation suppressing member 189 is composed of a material which Cr and Fe do not penetrate by heat supply from the outside. In the present embodiment, the deformation suppressing member 189 is made of copper such as oxygen-free copper. The thermal conductivity of copper such as oxygen-free copper is 300 W/m·K or more at 100° C., which is particularly desirable as the deformation suppressing member 189.

During the irradiation of the outer circumferential surface of the pipe 2 with the laser beam 184, a pipe outer circumferential surface shield gas 186 and the pipe inner circumferential surface shield gas 187 are used for preventing oxidation of the reform portion 185. Shield gas types are all $N_2$. Since the inner circumferential surface side 202 of the reform portion 185 of the pipe 2 is covered with the deformation suppressing member 189, the pipe inner circumferential surface shield gas 187 does not directly act on the inner circumferential surface of the reform portion 185, but is effective for preventing oxidation in the vicinity of the inner circumferential surface side 202 of the reform portion 185. A process portion shield jig 188 is used to enable shielding both sides on the outer circumferential surface side 201 and the inner circumferential surface side 202 (vicinity) of the reform portion 185 of the pipe 2.

Upon formation of the reform portion 185, in order not to melt the pipe 2 too much and not to keep the stainless steel remain in that region, the pipe 2 is rotated at a predetermined speed in a direction of p, and the wire 181 is continuously fed at a predetermined speed to the outer circumferential surface of the pipe 2, thereby the laser beam 184 is applied to the wire 181 and the outer circumferential surface of the pipe 2 while circulating the pipe outer circumferential surface shield gas 186 and the pipe inner circumferential surface shield gas 187 for a predetermined amount. In the present embodiment, the wire (linear member) is used as the Ni-containing material, but the present invention is not limited to this. The powder may be supplied as the Ni-containing material, and the coating of the Ni-containing material may be formed on the outer circumferential surface side 201 of the pipe 2 beforehand. The powder including solid or hollow particles can be immobilized on the outer circumferential surface side 201 of the pipe 2 by suspending the powder in a solvent or the like to forma paste. The coating can be formed by a vacuum vapor deposition method such as sputtering or a cold spray method.

Figure 2C:
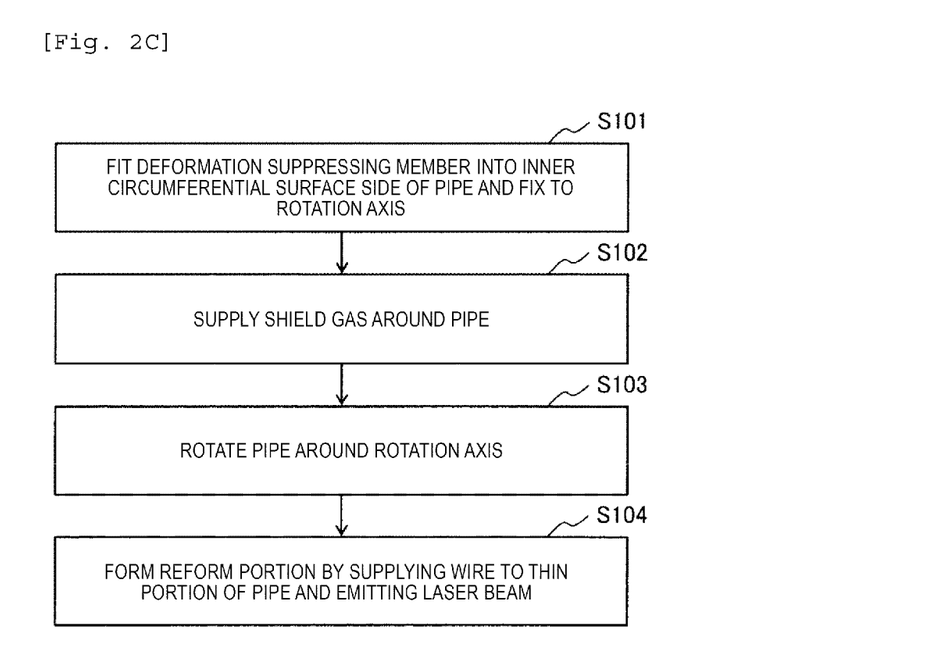
FIG. 2C is a flowchart illustrating a reforming method of the pipe of the example.

FIG. 2C shows the steps of the above-described reforming method, that is, the method for manufacturing the pipe.

In FIG. 2C, a deformation suppressing member is fitted into the inner circumferential surface side of the pipe and fixed to the rotation axis (S101). Thereafter, the shield gas is supplied around the pipe (S102), and the pipe is rotated around the rotation axis (S103). Then, in a state where the pipe is rotated, a wire is supplied to the thin portion of the pipe, and the laser beam is emitted to form the reform portion (S104).

[Configuration of Cross Section of Reform Portion]

Figure 4:
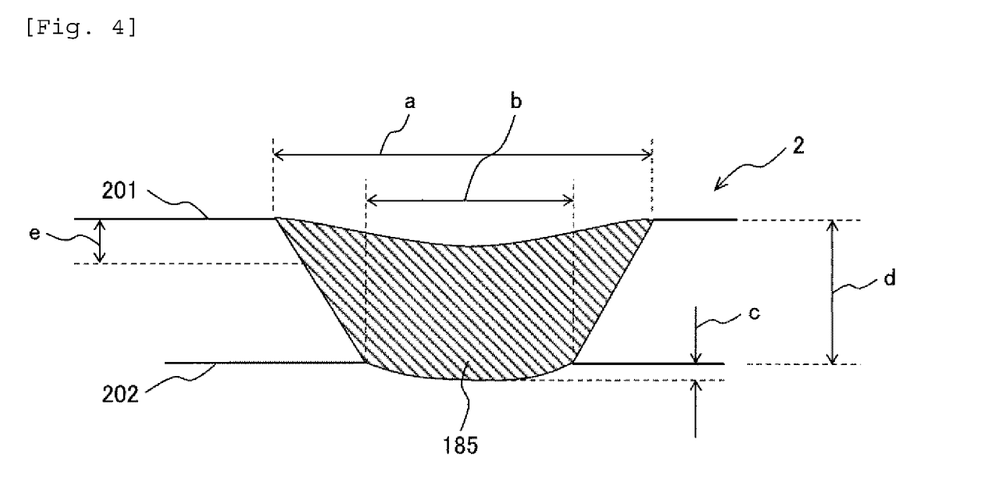
FIG. 4 is a schematic diagram illustrating a cross section of a reform portion.

FIG. 4 schematically shows the shape of the reform portion in the cross section including the rotation axis of the pipe.

As shown in FIG. 1, the reform portion 185 is formed in the thin portion of the pipe 2. In addition, the reform portion 185 is formed in an annular shape in the pipe 2.

In FIG. 4, the width of the reform portion 185 on the outer circumferential surface side 201 of the pipe 2 is a, the width of the reform portion 185 on the inner circumferential surface side 202 of the pipe 2 is b, the maximum deformation amount on the inner circumferential surface side 202 of the reform portion 185 in the pipe 2 is c, the thickness in the vicinity of the reform portion 185 of the pipe 2 is d, and the maximum deformation amount on the outer circumferential surface side 201 of the pipe 2 is e.

It is preferable that the shape of the reform portion 185 of the pipe 2 used for the solenoid valve has e/d of 0.5 or less and c/d of 0.5 or less. In the case where the solenoid valve of the present invention is employed as the fuel injection valve, in order to prevent interference between the pipe connector 3 and the anchor 4 and the reform portion 185 of the pipe 2, it is more preferable that the shape of the reform portion 185 of the pipe 2 has e/d of 0.25 or less. Further, it is preferable to fit the deformation suppressing member 189 (FIG. 2A) having a thermal conductivity of 30 W/m·K or more at 100° C. on the inner circumferential surface side 202 of the reform portion 185 of the pipe 2. Thereby, the reform portion 185 in the molten state is supported by the deformation suppressing member 189 so as not to fall into the inner circumferential surface side 202 of the pipe 2, and the reform portion 185 in the molten state can be rapidly cooled by the deformation suppressing member 189 with high thermal conductivity and solidified while c is small. That is, in order to make e/d 0.5 or less and c/d 0.5 or less, it is necessary to adopt a process of fitting the deformation suppressing member 189 of which the thermal conductivity is 30 W/m·K at 100° C. into the inner circumferential surface side 202 of the reform portion 185 of the pipe 2.

Further, the shape of the reform portion 185 of the pipe 2 used for the solenoid valve preferably has a/b of 1.4 or more. By fitting a deformation suppressing member 189 having a thermal conductivity of 30 W/m·K or more at 100° C. into the inner circumferential surface side 202 of the reform portion 185 of the pipe 2, the reform portion 185 in the molten state can be rapidly cooled and solidified in the state where b is small. The width a of the reform portion 185 on the outer circumferential surface side 201 of the pipe 2 which is not rapidly cooled is not affected by the fitting of the deformation suppressing member 189. That is, in a case where the deformation suppressing member 189 is fitted, a/b can be increased as compared with the case where the deformation suppressing member 189 is not fitted, specifically, a/b can be set to 1.4 or more.

Further, by fitting the deformation suppressing member 189 having a thermal conductivity of 30 W/m·K or more at 100° C. into the inner circumferential surface side 202 of the reform portion 185 of the pipe 2, the reform portion 185 in molten state can be rapidly cooled and the inner circumferential surface side 202 of the reform portion 185 of the pipe 2 can be kept smooth. The smoothness of the inner circumferential surface side 202 of the reform portion 185 is defined as c/b. In a case where the solenoid valve of the present invention is adopted as the fuel injection valve and the anchor 4 to be operated comes into contact with the reform portion 185 of the pipe 2, by setting c/b to be 0.025 or less, it is possible to reduce contact surface pressure between the anchor 4 and the reform portion 185 of the pipe 2 so that the operation of the anchor 4 is not disturbed. Therefore, it is preferable that the shape of the reform portion 185 of the pipe 2 used for the solenoid valve has c/b of 0.025 or less.

In a finished product of the pipe 2, the reform portion 185 can be distinguished from other regions by etching.

[Evaluation Method of Saturation Magnetization]

Figure 5:
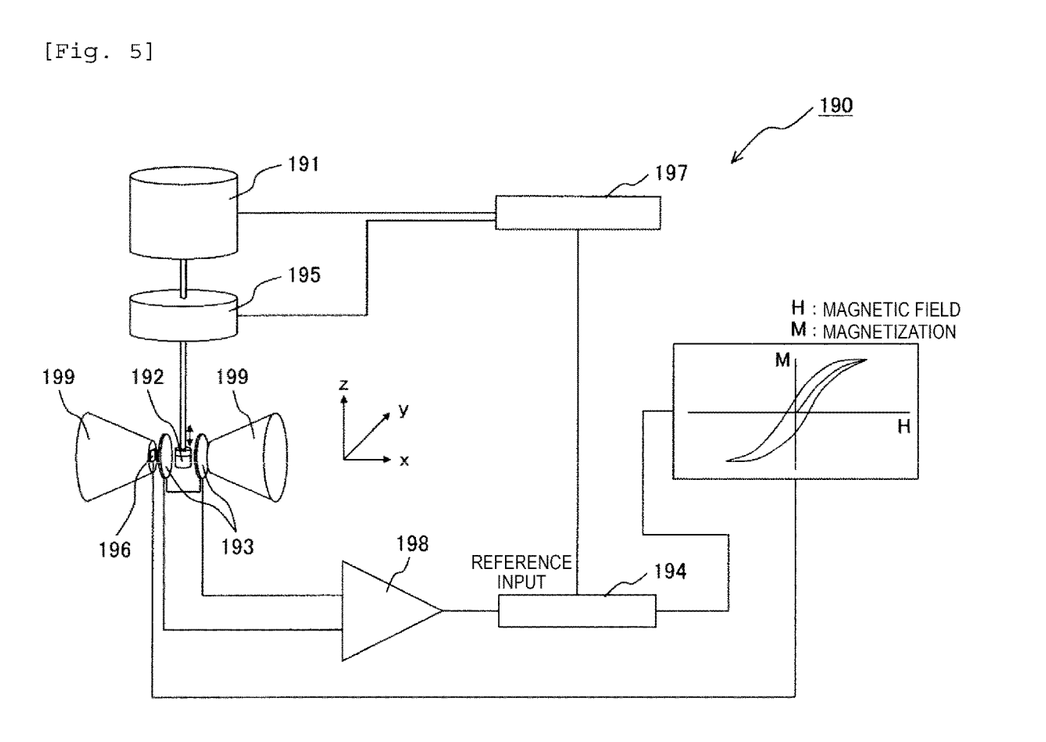
FIG. 5 is a principle diagram of a sample vibration type magnetometer.

FIG. 5 is a principle diagram of a sample vibration type magnetometer 190 (hereinafter referred to as Vibration Sample Magnetometer (VSM)) used for evaluating the saturation magnetization in the present embodiment.

In the VSM, by using a vibrator 191 to vibrate a sample 192 with a minute amplitude, the time change of the magnetic flux generated by the magnetization of the sample is detected as the induced electromotive force by a detection coil 193 in the vicinity of the sample, and the magnetization of the sample can be measured from the induced electromotive force. Since the induced electromotive force is weak, the magnetization can be measured with high sensitivity by passing through a lock-in amplifier 194.

Reference numeral 195 denotes an amplitude sensor, reference numeral 196 denotes a magnetic field sensor, reference numeral 197 denotes a vibration control unit, reference numeral 198 denotes a preamplifier, and reference numeral 199 denotes a magnet.

The saturation magnetization value is obtained by cutting out the reform portion 185 (FIG. 4) of the pipe 2, measuring the magnetization curve of the reform portion 185 using the VSM, and obtaining the magnetization value when the magnetic field is $1.6 \times 10^6$ A/m. The saturation magnetization value of the pipe 2 before reforming is 1.6 T.

Examples and comparative examples will be described below.

Example 1

As shown in FIGS. 2A and 2B, after fitting the deformation suppressing member 189 into the inner circumferential surface side 202 of the pipe 2, the pipe 2 was rotated in the direction of p, and the outer circumferential surface of the pipe 2 and the wire 181 were irradiated with the laser beam 184 while feeding and adding the wire 181 made of pure Ni material and having a solid circular cross-sectional shape to the thin portion 23 of the pipe 2 (shown in FIG. 1) thereby forming the reform portion 185. The output of the laser beam 184 was set to 1100 W, the rotation speed of the pipe 2 was set to 1500 mm/min, the feeding speed of the wire 181 was set to 700 mm/min, the feeding time of the wire 181 and the irradiation time of the laser beam 184 were set to 1076 msec, the flow rate of the pipe outer circumferential surface shield gas 186 was set to 10 L/min, and the flow rate of the pipe inner circumferential surface shield gas 187 was set to 20 L/min to perform the reforming.

The ratio e/d of the maximum deformation amount e of the outer circumferential surface side 201 of the reform portion 185 with respect to the thickness d of the pipe 2 was 0.23, the ratio c/d of the deformation amount c to the inner circumferential surface side 202 of the reform portion 185 with respect to the thickness d of the pipe 2 was 0.11, the ratio a/b of the width a of the outer circumferential surface side 201 of the reform portion 185 with respect to the width b of the inner circumferential surface side 202 of the reform portion 185 was 1.74, and the ratio c/b of the maximum deformation amount c to the inner circumferential surface side 202 of the reform portion 185 with respect to the width b of the inner circumferential surface side 202 of the reform portion 185 was 0.014. In addition, only the reform portion 185 was cut and the saturation magnetization value was measured, which was 0.06 T.

According to Example 1, the deformation amount of the reform portion 185 after the process was reduced, and the saturation magnetization value was reduced by about 96% before the reforming. That is, in the pipe which is entirely ferromagnetic before the process, the depressing deformation amount on the inner circumferential surface side 202 and the recessed deformation amount on the outer circumferential surface side 201 were controlled to be small and the process portion was locally feeble magnetized. By using the pipe obtained in Example 1 for the solenoid valve, it is possible to provide a solenoid valve with low processing cost and high responsiveness. Further, by installing the solenoid valve obtained in Example 1 as the fuel injection valve 1 in an automobile, it is possible to contribute to improvement in fuel efficiency of the automobile.

In a case where the electron beam is emitted instead of the laser beam so that the ratio e/d of the maximum deformation amount e of the outer circumferential surface side 201 of the reform portion 185 with respect to the thickness d of the pipe 2 and the ratio c/d of the deformation amount c to the inner circumferential surface side 202 of the reform portion 185 with respect to the thickness d of the pipe 2 are the same as in Example 1, it is checked that the deformation amount of the reform portion 185 after the process can be reduced, and the saturation magnetization value can be reduced to the same degree before reforming.

Example 2

As shown in FIGS. 2A and 2B, after fitting the deformation suppressing member 189 into the inner circumferential surface side 202 of the pipe 2, the pipe 2 was rotated in the direction of p, and the outer circumferential surface of the pipe 2 and the wire 181 were irradiated with the laser beam 184 while feeding and adding the wire 181 made of pure Ni material and having a solid circular cross-sectional shape to the thin portion 23 of the pipe 2 (shown in FIG. 1) thereby forming the reform portion 185. The output of the laser beam 184 was set to 1200 W, the rotation speed of the pipe 2 was set to 1500 mm/min, the feeding speed of the wire 181 was set to 700 mm/min, the feeding time of the wire 181 and the irradiation time of the laser beam 184 were set to 1076 msec, the flow rate of the pipe outer circumferential surface shield gas 186 was set to 10 L/min, and the flow rate of the pipe inner circumferential surface shield gas 187 was set to 20 L/min to perform the reforming.

The ratio e/d of the maximum deformation amount e of the outer circumferential surface side 201 of the reform portion 185 with respect to the thickness d of the pipe 2 was 0.17, the ratio c/d of the deformation amount c to the inner circumferential surface side 202 of the reform portion 185 with respect to the thickness d of the pipe 2 was 0.31, the ratio a/b of the width a of the outer circumferential surface side 201 of the reform portion 185 with respect to the width b of the inner circumferential surface side 202 of the reform portion 185 was 1.49, and the ratio c/b of the maximum deformation amount c to the inner circumferential surface side 202 of the reform portion 185 with respect to the width b of the inner circumferential surface side 202 of the reform portion 185 was 0.017. In addition, only the reform portion 185 was cut and the saturation magnetization value was measured, which was 0.08 T.

According to Example 2, the deformation amount of the reform portion 185 after the process was reduced, and the saturation magnetization value was reduced by about 95% before the reforming. That is, in the pipe which is entirely ferromagnetic before the process, the depressing deformation amount on the inner circumferential surface side 202 and the recessed deformation amount on the outer circumferential surface side 201 were controlled to be small and the process portion was locally feeble magnetized. By using the pipe obtained in Example 2 for the solenoid valve, it is possible to provide a solenoid valve with low processing cost and high responsiveness. Further, by installing the solenoid valve obtained in Example 2 as the fuel injection valve 1 in an automobile, it is possible to contribute to improvement in fuel efficiency of the automobile.

In a case where high-frequency heating is used instead of the laser beam so that the ratio e/d of the maximum deformation amount e of the outer circumferential surface side 201 of the reform portion 185 with respect to the thickness d of the pipe 2 and the ratio c/d of the deformation amount c to the inner circumferential surface side 202 of the reform portion 185 with respect to the thickness d of the pipe 2 are the same as in Example 2, it is checked that the deformation amount of the reform portion 185 after the process can be reduced, and the saturation magnetization value can be reduced to the same degree before reforming.

Comparative Example 1

Figure 3A:
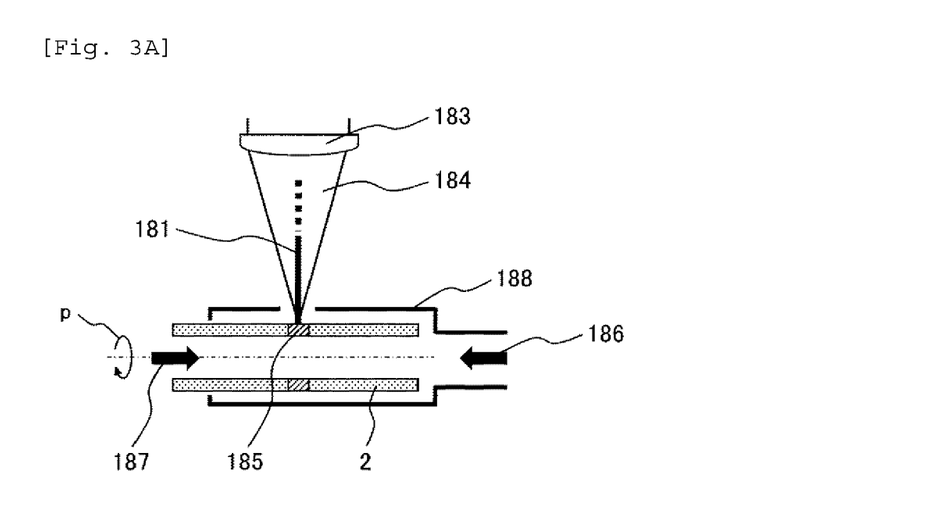
FIG. 3A is a longitudinal sectional view illustrating a main portion of a reforming device of a pipe of a comparative example.
Figure 3B:
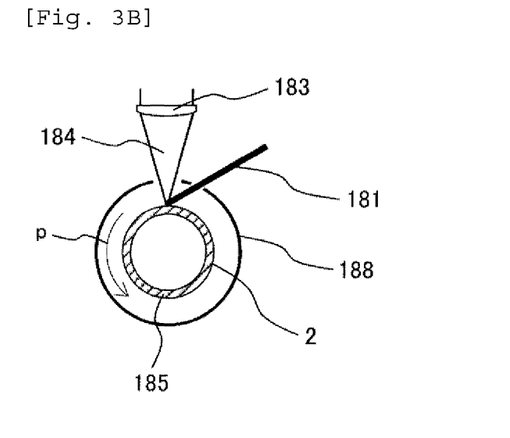
FIG. 3B is a cross sectional view illustrating the main portion of the reforming device of the pipe of the comparative example.

As shown in FIGS. 3A and 3B, without fitting the deformation suppressing member into the inner circumferential surface side 202 of the pipe 2, the pipe 2 was rotated in the direction of p, and the outer circumferential surface of the pipe 2 and the wire 181 were irradiated with the laser beam 184 while feeding and adding the wire 181 made of pure Ni material and having a solid circular cross-sectional shape to the thin portion 23 of the pipe 2 (shown in FIG. 1) thereby forming the reform portion 185. The output of the laser beam 184 was set to 850 W, the rotation speed of the pipe 2 was set to 1500 mm/min, the feeding speed of the wire 181 was set to 750 mm/min, the feeding time of the wire 181 and the irradiation time of the laser beam 184 were set to 1076 msec, the flow rate of the pipe outer circumferential surface shield gas 186 was set to 20 L/min, and the flow rate of the pipe inner circumferential surface shield gas 187 was set to 10 L/min to perform the reforming.

The ratio e/d of the maximum deformation amount e of the outer circumferential surface side 201 of the reform portion 185 with respect to the thickness d of the pipe 2 was 1.61, the ratio c/d of the deformation amount c to the inner circumferential surface side 202 of the reform portion 185 with respect to the thickness d of the pipe 2 was 1.48, the ratio a/b of the width a of the outer circumferential surface side 201 of the reform portion 185 with respect to the width b of the inner circumferential surface side 202 of the reform portion 185 was 1.31, and the ratio c/b of the maximum deformation amount c to the inner circumferential surface side 202 of the reform portion 185 with respect to the width b of the inner circumferential surface side 202 of the reform portion 185 was 0.12. In addition, only the reform portion 185 was cut and the saturation magnetization value was measured, which was 0.12 T.

According to Comparative example 1, although the reduction rate of the saturation magnetization value before reforming was greatly reduced to about 93%, the deformation amount of the reform portion 185 after process (the depressing deformation amount on the inner circumferential surface side 202 and the recessed deformation amount on the outer circumferential surface side 201) could not be controlled to be small. Therefore, in a case where the pipe obtained in Comparative example 1 is directly attached to the solenoid valve, it is not possible to provide a highly responsive solenoid valve. Further, since e/d exceeds 1, a hole is generated in the reform portion 185 by processing from the inner circumferential surface side 202 of the pipe 2. That is, even if processing is performed from the inner circumferential surface side 202 of the pipe 2, a highly responsive solenoid valve cannot be provided. When the solenoid valve obtained in Comparative example 1 as the fuel injection valve 1 is installed in an automobile, it cannot contribute to improvement in fuel efficiency of the automobile.

Comparative Example 2

As shown in FIGS. 3A and 3B, without fitting the deformation suppressing member into the inner circumferential surface side 202 of the pipe 2, the pipe 2 was rotated in the direction of p, and the outer circumferential surface of the pipe 2 and the wire 181 were irradiated with the laser beam 184 while feeding and adding the wire 181 made of pure Ni material and having a solid circular cross-sectional shape to the thin portion 23 of the pipe 2 (shown in FIG. 1) thereby forming the reform portion 185. The output of the laser beam 184 was set to 930 W, the rotation speed of the pipe 2 was set to 1500 mm/min, the feeding speed of the wire 181 was set to 700 mm/min, the feeding time of the wire 181 and the irradiation time of the laser beam 184 were set to 1076 msec, the flow rate of the pipe outer circumferential surface shield gas 186 was set to 20 L/min, and the flow rate of the pipe inner circumferential surface shield gas 187 was set to 10 L/min to perform the reforming.

The ratio e/d of the maximum deformation amount e of the outer circumferential surface side 201 of the reform portion 185 with respect to the thickness d of the pipe 2 was 1.77, the ratio c/d of the deformation amount c to the inner circumferential surface side 202 of the reform portion 185 with respect to the thickness d of the pipe 2 was 1.73, the ratio a/b of the width a of the outer circumferential surface side 201 of the reform portion 185 with respect to the width b of the inner circumferential surface side 202 of the reform portion 185 was 1.05, and the ratio c/b of the maximum deformation amount c to the inner circumferential surface side 202 of the reform portion 185 with respect to the width b of the inner circumferential surface side 202 of the reform portion 185 was 0.14. In addition, only the reform portion 185 was cut and the saturation magnetization value was measured, which was 0.63 T.

According to Comparative example 2, the reduction rate of the saturation magnetization value with respect to before the reforming was only about 60%, and the deformation amount of the reform portion 185 after process (the depressing deformation amount c on the inner circumferential surface side 202 and the recessed deformation amount e on the outer circumferential surface side 201) could not be controlled to be small. Therefore, in a case where the pipe obtained in Comparative example 2 is directly attached to the solenoid valve, it is not possible to provide a highly responsive solenoid valve from either viewpoints of the magnetic characteristics and the shape of the reform portion 185. When the solenoid valve obtained in Comparative example 2 as the fuel injection valve 1 is installed in an automobile, it cannot contribute to improvement in fuel efficiency of the automobile.

Table 1 summarizes the results of the above examples and comparative examples.

TABLE 1

|  | Example 1 | Example 2 | Comparative Example 1 | Comparative Example 2 |
|---|---|---|---|---|
| Saturation magnetization (T) | 0.06 | 0.08 | 0.12 | 0.63 |
| e/d | 0.23 | 0.17 | 1.61 | 1.77 |
| c/d | 0.11 | 0.31 | 1.48 | 1.73 |
| a/b | 1.74 | 1.49 | 1.31 | 1.05 |
| c/b | 0.014 | 0.017 | 0.12 | 0.14 |

REFERENCE SIGNS LIST

1: fuel injection valve
2: pipe
3: pipe connector
4: anchor
5: valve body
6: valve seat
7: valve seat member
8: nozzle plate
9: electromagnetic coil
10: yoke
11: valve member
12: fuel filter
13: coil spring
14: O-ring
15: connector pin
16: coupling core
17: protector
21: large diameter portion (of pipe)
22: small diameter portion (of pipe)
23: thin portion
24: pipe connector accommodating portion
25: valve member accommodating portion
26: fuel passage (of pipe)
31: hollow portion (of pipe connector)
32: spring receiving member
33: fuel passage (of pipe connector)
41: large diameter portion (of anchor)
42: small diameter portion (of anchor)
43: spring accommodating portion
44: fuel passage hole (of anchor)
45: spring receiving portion (of anchor)
51: fuel passage (of valve body)
71: valve body holding hole
72: upstream opening portion
73: downstream opening portion
91: bobbin
92: coil
101: large diameter portion (of yoke)
102: medium diameter portion (of yoke)
103: small diameter portion (of yoke)
181: wire
183: condenser lens
184: laser beam
185: reform portion
186: pipe outer circumferential surface shield gas
187: pipe inner circumferential surface shield gas
188: process portion shield jig
189: deformation suppressing member
190: sample vibration type magnetometer
191: vibrator
192: sample
193: detection coil
194: lock-in amplifier
195: amplitude sensor
196: magnetic field sensor
197: vibration control unit
198: preamplifier
199: magnet
201: outer circumferential surface side (of pipe)
202: inner circumferential surface side (of pipe)

The invention claimed is:
1. A solenoid valve comprising:
a pipe formed of a ferromagnetic material containing 15 mass % or more to 18 mass % or less of Cr;
wherein the pipe comprises a first portion and a second portion, wherein a diameter of the second portion is less than a diameter of the first portion;
an electromagnetic coil;
a valve body;
a movable component configured to move in response to a magnetic force; and
a stationary component located upstream of the movable component;
wherein each of the movable component and the stationary component are encompassed within the pipe;
wherein the second portion further comprises a first receiving portion and second receiving portion and wherein the first receiving portion is configured to receive the stationary component and the second receiving portion is configured to receive the movable component;
a filter disposed upstream of the stationary component, wherein the second portion is configured to increase magnetic resistance between the first receiving portion when the stationary component is received in the first receiving portion and the second receiving portion when the movable component is received in the second receiving portion;
wherein a part of the pipe includes a reform portion;
wherein the reform portion has a composition in which a component of the ferromagnetic material is mixed with a component of a Ni-containing material; and wherein e/d which is a ratio of a maximum deformation amount e of an outer circumferential surface side of the reform portion of the pipe with respect to a thickness d near the reform portion of the pipe is 0.5 or less, and c/d which is a ratio of a maximum deformation amount c of an inner circumferential surface side of the reform portion of the pipe with respect to the thickness d of the pipe is 0.5 or less.

2. The solenoid valve according to claim 1, wherein a/b which is a ratio of a width a of the outer circumferential surface side of the reform portion of the pipe with respect to a width b of the inner circumferential surface side of the reform portion of the pipe is 1.4 or more.

3. The solenoid valve according to claim 2, wherein a saturation magnetization value of the reform portion at an applied magnetic field of $1.6 \times 10^6$ A/m is less than 0.6 T.

4. The solenoid valve according to claim 1, wherein c/b which is a ratio of the maximum deformation amount c of the inner circumferential surface side of the reform portion of the pipe with respect to the width b of the inner circumferential surface side of the reform portion of the pipe is 0.025 or less.

5. The solenoid valve according to claim 1, wherein the reform portion is formed in a thin portion of the pipe.

6. The solenoid valve according to claim 1, wherein the reform portion is formed in an annular shape in the pipe.

7. The system of claim 1, wherein the second portion is configured to surround a gap between the movable component and the stationary component.

8. A method for manufacturing a solenoid valve which includes a pipe formed of a ferromagnetic material containing 15 mass % or more to 18 mass % or less of Cr, the pipe having a first portion with a larger diameter than a diameter of a second portion wherein the second portion comprises a first receiving portion and a second receiving portion, an electromagnetic coil, a valve body, a movable component configured to move in response to a magnetic force, and a stationary component located upstream of the movable component, wherein each of the movable component and the stationary component are encompassed within the pipe, and wherein the first receiving portion receives the stationary component and the second receiving portion receives the movable component, a filter disposed upstream of the stationary component, wherein the second portion is configured to increase magnetic resistance between the first receiving portion when the stationary component is received in the first receiving portion and the second receiving portion when the movable component is received in the second receiving portion, and in which a part of the pipe includes a reform portion, the method comprising:

a step of fitting a deformation suppressing member having a thermal conductivity of 30 W/m·K or more at 100° C. into the inner circumferential surface side of the pipe;

a step of supplying or attaching a Ni-containing material to a part of the pipe; and a step of forming the reform portion by applying heat from an outer side to a portion where the Ni-containing material is supplied or attached.

9. The method for manufacturing a solenoid valve according to claim 8, wherein the pipe rotates around the deformation suppressing member as a rotation axis.

10. The method for manufacturing a solenoid valve according to claim 8, wherein shield gas is supplied around the pipe.

11. The method for manufacturing a solenoid valve according to claim 8, wherein a portion where the Ni-containing material is supplied or attached is a portion near a contact surface between an anchor and a pipe connector in the outer circumferential surface of the pipe.

12. The method for manufacturing a solenoid valve according to claim 8, wherein the Ni-containing material is one of a wire, a powder, or a coating.

13. The method for manufacturing a solenoid valve according to claim 12, wherein a cross-sectional shape of the wire is a circle, an ellipse or a rectangle, and is solid or hollow.

14. The method for manufacturing a solenoid valve according to claim 12, wherein the wire is supplied by being wound around a part of the outer circumferential surface of the pipe or by continuously being fed to the part of the outer circumferential surface of the pipe.

15. The method for manufacturing a solenoid valve according to claim 12, wherein the powder includes solid or hollow particles.

16. The method for manufacturing a solenoid valve according to claim 12, wherein the coating is formed on at least a part of the outer circumferential surface of the pipe before the heat is applied.

17. The method for manufacturing a solenoid valve according to claim 8, wherein the heat is supplied by laser irradiation, electron beam irradiation, or high-frequency induction heating.

* * * * *